United States Patent [19]

Yamamoto

[11] Patent Number: 4,467,953
[45] Date of Patent: Aug. 28, 1984

[54] COLD PRESSING METHOD

[75] Inventor: Toshio Yamamoto, Yokosuka, Japan

[73] Assignee: Tokyo Shibaura Denki Kabushiki Kaisha, Kawasaki, Japan

[21] Appl. No.: 359,997

[22] Filed: Mar. 19, 1982

[30] Foreign Application Priority Data

Mar. 26, 1981 [JP] Japan .................. 56-43140

[51] Int. Cl.³ .................. B23K 20/02; B23K 20/24
[52] U.S. Cl. .................. 228/116; 228/173 C
[58] Field of Search .................. 228/115, 116, 173 C

[56] References Cited

U.S. PATENT DOCUMENTS 2,763,057 9/1956 Clair, Jr. .................. 228/115
3,178,811 4/1965 Fuller .................. 228/116

FOREIGN PATENT DOCUMENTS

H17581 12/1955 Fed. Rep. of Germany ...... 228/115
1340279 9/1963 France .................. 228/115
869934 6/1961 United Kingdom .
942331 11/1963 United Kingdom .
972704 10/1964 United Kingdom .
1102437 2/1968 United Kingdom .

Primary Examiner—Kenneth J. Ramsey
Attorney, Agent, or Firm—Oblon, Fisher, Spivak, McClelland & Maier

[57] ABSTRACT

A cold pressing method which comprises the steps of forming sheets to be pressed together into the disc form by a press work device, forming annular projections inside of the annular cold pressing section of the sheets in order to release a stress caused by the deformation of the sheets resulting from the plastic fluidity of their annular junction, superposing the sheets and cold pressing the superposed sheets around the annular cold pressing section with elevated adhesivity.

3 Claims, 10 Drawing Figures

F I G. 3A
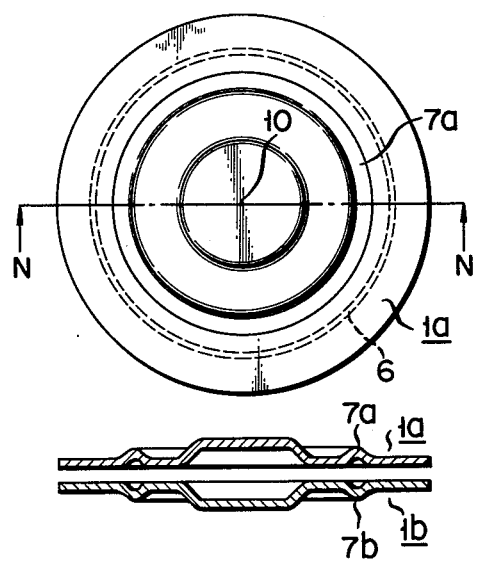
F I G. 3B
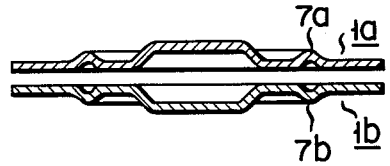
F I G. 4
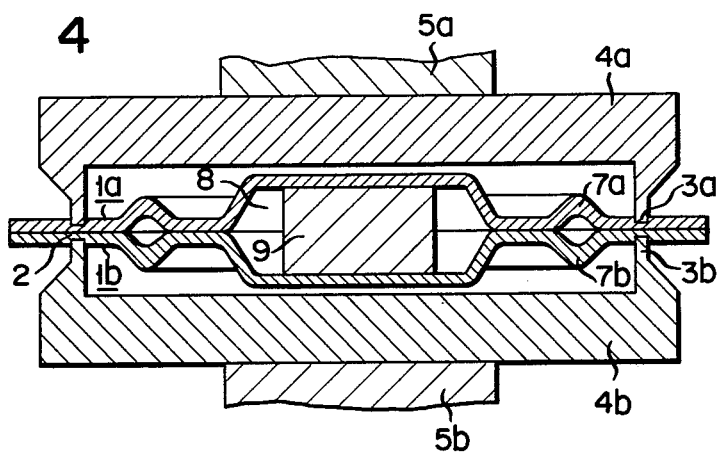
F I G. 5
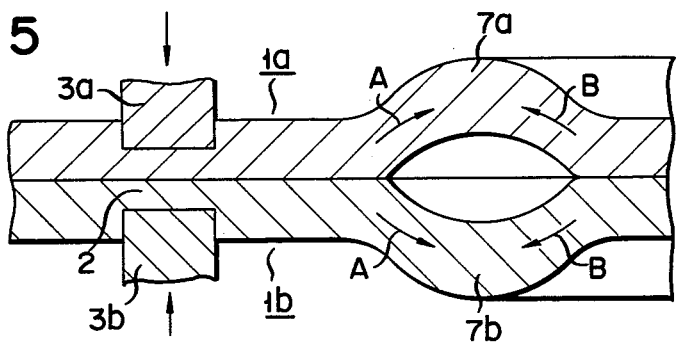

COLD PRESSING METHOD

BACKGROUND OF THE INVENTION

This invention relates to a method of cold pressing a plurality of superposed sheets. Where an element harmfully affected by heat such as a semiconductor element, is sealed, the conventional process comprises sealing a vessel of said semiconductor element by cold pressing.

An important factor of governing the adhesiveness of an object subjected to cold pressing is the plastic fluidity of that part of said object which undergoes pressure. Where superposed discs 1a, 1b of FIG. 1 are pressed together at an annular junction 2, then two opposing stresses arise inside of said annular junction 2 due to deformation resulting from the plastic fluidity of said discs 1a, 1b at said annular junction 2. These stresses act to obstruct the plastic fluidity of said pressed discs 1a, 1b at said annular junction 2, thereby raising the problems that the adhesivity of the superposed discs 1a, 1b at said annular junction 2 drops to bring about unsatisfactory adhesion. Where the superposed discs 1a, 1b have a great thickness, or the annular junction 2 is widely spaced from the outer edges of the superposed discs 1a, 1b, then deformation resulting from the plastic fluidity of said discs 1a, 1b at said annular junction 2 gives rise to a force which tends to expand the outer portion of the annular junction 2, that is, the occurrence of a reactionary stress. This reactionary stress caused by said deformation act to obstruct the plastic fluidity of the superposed discs 1a, 1b at the annular junction 2. Consequently the same problem is raised on the outside of the annular junction 2, as on the inside thereof.

Therefore, the conventional process of minimizing the decrease of pressure adhesivity caused by deformation resulting from the plastic fluidity of a plurality of superposed sheets, for example, at the annular junction, comprises elevating the workability of superposed sheets, as much as possible. (Said workability is herein defined to mean the extent to which the thickness of superposed sheets at the annular junction can be reduced.) Where, however, superposed sheets fabricated with high workability are pressed together, then the joint of said superposed sheets has a reduced thickness, resulting in a decline in the mechanical strength of a product obtained by pressure adhesion.

SUMMARY OF THE INVENTION

It is accordingly the object of this invention to provide a cold pressing method which assures the cold pressing of a plurality of sheets having a proper workability or thickness with high adhesivity without sacrificing the mechanical strength of a pressed product.

To attain the above-mentioned object, this invention provides a method of cold pressing sheets which comprises the steps of:

initially providing a section for releasing a stress caused by deformation resulting from the plastic fluidity of the pressed portions of said sheets in the proximity of an annular section in which said sheets are to be pressed together, and superposing said sheets and cold pressing them at said prescribed annular pressing section.

BRIEF DESCRIPTION OF THE DRAWINGS

FIG. 3A is a plan view of superposed disc sheets to be cold pressed by a method according to a first embodiment of this invention;

FIG. 3B is a longitudinal sectional view on line N—N of FIG. 3A;

FIG. 14 is a longitudinal sectional view of the superposed sheets of FIG. 3 cold pressed in a cold pressed apparatus;

FIG. 5 illustrates the released condition of stresses near the pressurized section of the superposed discs;

DETAILED DESCRIPTION OF THE PREFERRED EMBODIMENTS

Description is now given with reference to the accompanying drawing of the case where a vessel sealing a semiconductor device is cold pressed.

Figure 1A:
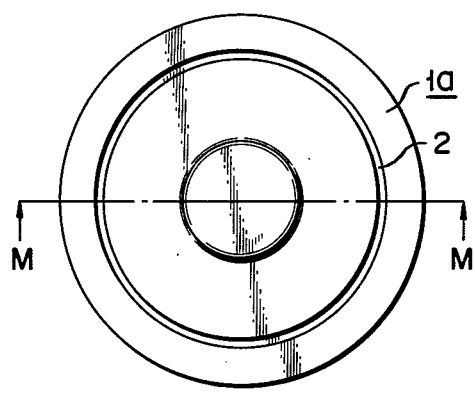
FIG. 1A is a plan view of a plurality of superposed disc sheets pressed together by the conventional cold pressing method.
Figure 1B:
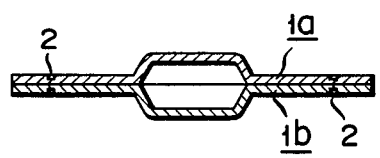
FIG. 1B is a longitudinal sectional view on line M—M of FIG. 1A.
Figure 2:
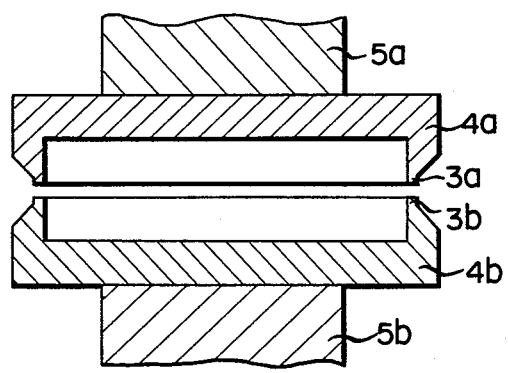
FIG. 2 shows the main section of an apparatus for effecting cold pressing embodying this invention.

A cold pressing method embodying this invention is carried out by applying the known press work machine (not shown) for fabricating an object sheet into a prescribed shape and an apparatus (whose main part is indicated in FIG. 2) for cold pressing said sheets superposed on each other. The cold pressing apparatus comprises dies 4a, 4b provided with mutually facing annular projections 3a, 3b, rests 5a, 5b for supporting said dies 4a, 4b and an oil pressure device (not shown) for driving said rests close to or apart from each other.

Before cold pressing, two disc sheets 1a, 1b each provided with a depression at the center are press worked into the prescribed shape as shown in FIG. 3. In this case, an annular projection 7a is formed on a disc sheet 1a around the proximity of the inner periphery of the annular pressing section 6 to be pressed. Similarly, an annular projection 7b is formed on a disc sheet 1b around the proximity of the inner periphery of said annular pressing section 6. These annular projections 7a, 7b are intended to release a stress caused by the deformation of the disc sheets 1a, 1b resulting from the plastic fluidity of said annular pressing section 6 when it is pressed. The central depressions of the disc sheets 1a, 1b are made to face each other to provide a holding space 8 in which a semiconductor element 9 is received. The annular pressing sections 6 of the disc sheets 1a, 1b are set on the annular projection 3b of the die 4b. Later, the cold pressing device is operated to cold press the disc sheets 1a, 1b as illustrated in FIG. 4.

In this case, plastic fluidity arises in the annular junction 2 of the cold pressed disc sheets 1a, 1b, resulting in their deformation. This deformation leads to the occurrence of two mutually opposing stresses A, B inside of said annular junction 2. As previously described, however, the annular projections 7a, 7b are formed around the proximity of the inner periphery of the annular junction 2 to release the above-mentioned stresses. As a result, the annular projections 7a, 7b are so deformed by said stresses as to give rise to a larger crease, thereby releasing the aforesaid opposing stresses A, B. Since, therefore, the plastic fluidity of the disc sheets 1a, 1b at the annular junction 2 is less obstructed by said stresses A, B, it is possible to cold press the disc sheets 1a, 1b completely even without considerably reducing their thickness.

Figure 6:
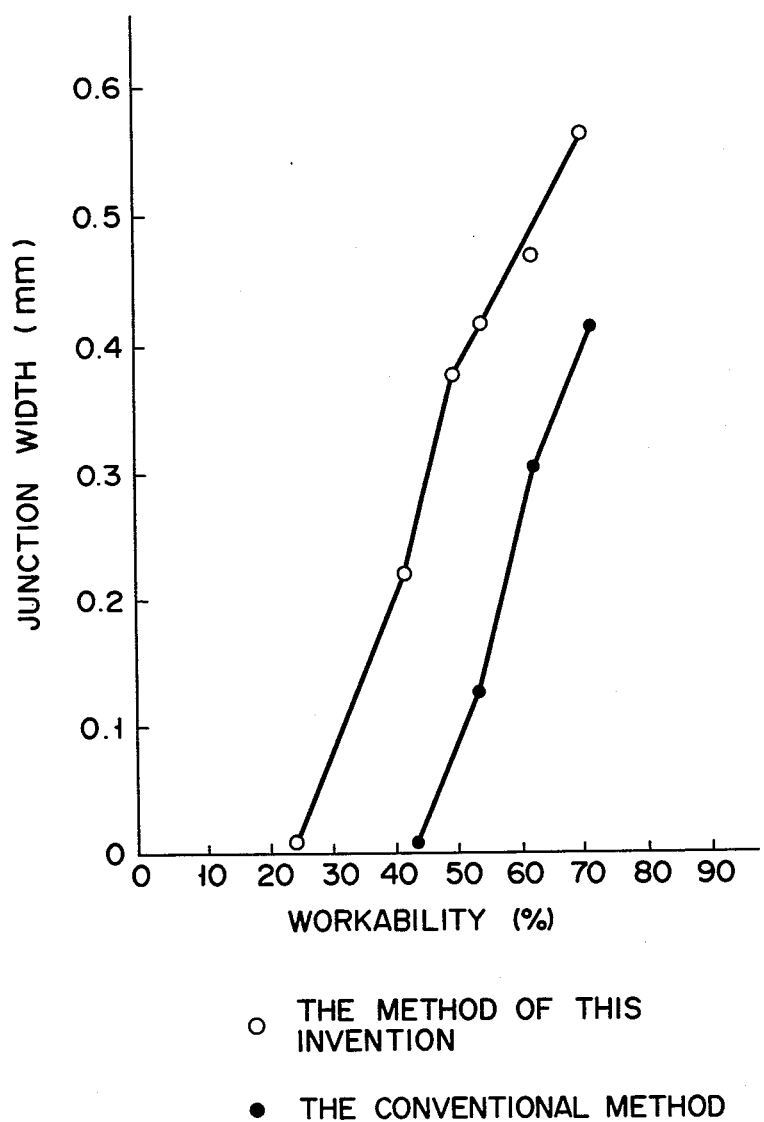
FIG. 6 indicates comparison between the workability or thickness and junction width of discs produced by the method according to the first embodiment of this invention and those of similar discs obtained by the conventional method.

Determination was made of the relationship between the thickness (0.4 mm) of copper disc sheets 1a, 1b and the width of the junction 2 of said sheets produced by the conventional cold pressing method and those obtained by that of this invention, the results of said comparison being set forth in FIG. 6. Where the junction width was chosen to be 0.3 mm, it was necessary to thin out the disc sheets 1a, 1b to 40% of their original thickness by applying pressure with respect to the conventional cold pressing method. In contrast, the cold pressing method of this invention makes it suffice to reduce the thickness of the disc sheets 1a, 1b by only about 45%. In other words, this invention enables disc sheets to be cold pressed satisfactorily with a low degree of machining, thereby preventing the cold pressed product from losing mechanical strength.

Figure 7:
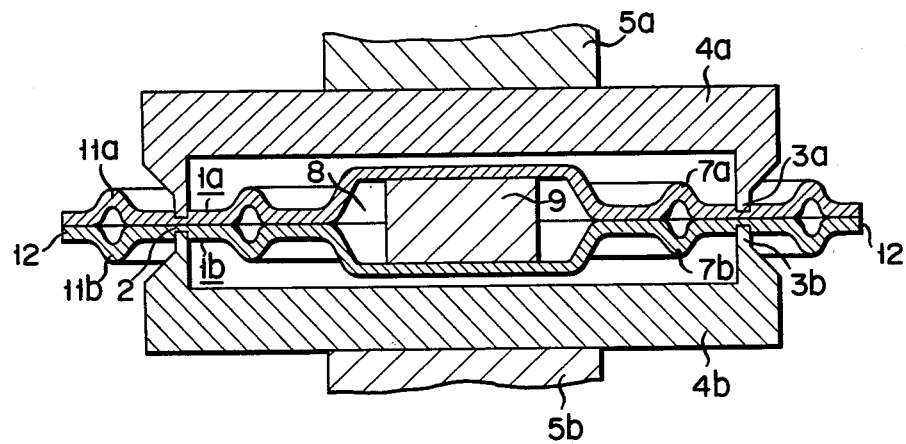
FIG. 7 is a longitudinal sectional view of superposed sheets cold pressed in a cold pressing apparatus by a method according to a second embodiment of the invention.

Description is now given with reference to FIG. 7 of a cold pressing method according to a second embodiment of this invention. As in the first embodiment of FIG. 4, annular projections 7a, 7b are respectively formed around the proximity of the inner periphery of the annular pressing sections of the disc sheets 1a, 1b. Further, annular projections 11a, 11b are formed around the proximity of the outer periphery of the annular pressing sections of the disc sheets 1a, 1b in order to release stresses caused by deformations resulting from the plastic fluidity of the annular junction 2 of said disc sheets 1a, 1b. With the second embodiment, not only the same effect as in the first embodiment is assured, but also the plastic fluidity of even the outer peripheral portion of the annular junction 2 is facilitated, thereby elevating the adhesivity of the superposed disc sheets 1a, 1b. The second embodiment exerts a prominent effect, particularly where the disc sheets 1a, 1b have a great thickness, or a large size or where the outer peripheral edge 12 of each of said disc sheets 1a, 1b is widely apart from the annular junction 2.

Figure 8:
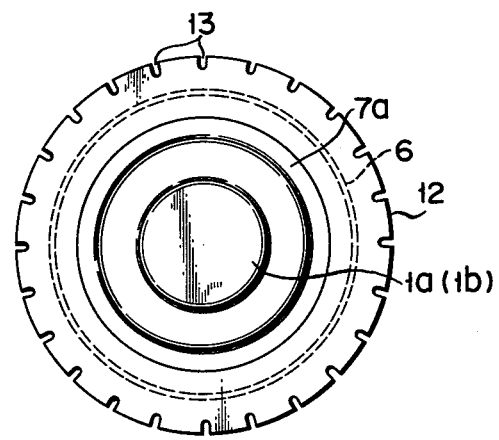
FIG. 8 is a plan view of superposed disc sheets produced by a method according to a third embodiment of the invention.

Description is now given with reference to FIG. 8 of a cold pressing method according to a third embodiment of this invention. A plurality of stress-releasing notches 13 are formed substantially equidistantly in the outer peripheral edge 12 in place of the annular projections 11a, 11b of the second embodiment. In this case, a stress caused by the deformation of the disc sheets 1a, 1b resulting from the plastic fluidity of their junction tends to expand the outside of the annular junction. But this stress is released by the deformation of the notches 13 formed in the outer peripheral edge 12 of the disc sheets 1a, 1b, thereby more effectively preventing the plastic fluidity of the junction of the disc sheets 1a, 1b from being obstructed, and improving the pressure adhesivity of the disc sheets 1a, 1b. If, in the case of the third embodiment, not only the notches 13 but also the previously described annular projections 7a, 7b are provided, then said pressure adhesivity is more prominently improved.

According to a further embodiment of this invention (though not shown), it is possible to form a stress-releasing thin-walled portion on the inside or outside or on both sides of the annular pressing section of the disc sheets 1a, 1b. It is also possible to form the thin walled portion on the inside of said annular pressing section and provide notches on the outer peripheral edges of said disc sheets 1a, 1b. All the above-mentioned procedures reduce a stress obstructing the plastic fluidity of the annular junction of said disc sheets 1a, 1b, thereby elevating their pressure adhesivity.

As mentioned above, the cold pressing method of this invention takes the steps of forming sections for releasing stresses caused by the deformation of the disc sheets resulting from the plastic fluidity of their annular junction in the proximity of said annular pressing section, superposing said disc sheets, and carrying out the cold pressing of said disc sheets. Therefore, this invention enables disc sheets to be reliably cold pressed by machining than to an appreciably small extent and without sacrificing their mechanical strength.

Throughout the foregoing embodiments, a single stress-releasing annular projection is provided on the inside or outside of the annular pressing section of superposed disc sheets. However, this invention is not limited to this procedure, but it is possible to provide a plurality of such stress-releasing annular projections. Throughout the embodiments, the stress-releasing projection has an annular shape similar to the annular pressing section of the disc sheets. However, said stress-releasing projection may assume an elliptic or any other form. Further, said stress-releasing section may be formed discontinuously instead of continuously.

What is claimed as new and desired to be secured by Letters Patent of the United States is:

1. A cold pressing method which comprises the steps of:
    forming a plurality of equidistant notches on an outside portion of annular sheets to be pressure welded for releasing stress formed due to plastic fluidity of parts of said sheets to be pressure welded;
    superposing said sheets to be pressure welded; and
    cold welding said parts of said sheets to be pressure welded.

2. The cold pressing method according to claim 1, wherein annular projections for releasing stress formed due to the plastic fluidity of said sheets to be pressure welded are formed on an inside portion of said sheets to be pressure welded.

3. The cold pressing method according to claim 1, wherein an annular portion formed on an inside portion of the sheets to be pressure welded is made thin for releasing stress formed due to the plastic fluidity of the sheets to be pressure welded.

* * * * *